(12) United States Patent
Jochumsen et al.

(10) Patent No.: US 8,029,249 B2
(45) Date of Patent: Oct. 4, 2011

(54) METERING PUMP ASSEMBLY

(75) Inventors: Hans Henrik Jochumsen, Allerod (DK); Niels Stubager Kiemer, Sjaelland (DK); Karim Lindberg, Vekso (DK); Niels Torp Madsen, Birkerod (DK); Tom Johansen, Helsingborg (SE)

(73) Assignee: Grundfos NoNox a/s, Bjerringbro (DK)

( * ) Notice: Subject to any disclaimer, the term of this patent is extended or adjusted under 35 U.S.C. 154(b) by 371 days.

(21) Appl. No.: 11/813,233

(22) PCT Filed: Dec. 29, 2005

(86) PCT No.: PCT/EP2005/014112
§ 371 (c)(1),
(2), (4) Date: Nov. 1, 2007

(87) PCT Pub. No.: WO2006/072444
PCT Pub. Date: Jul. 13, 2006

(65) Prior Publication Data
US 2008/0138221 A1    Jun. 12, 2008

(30) Foreign Application Priority Data

Dec. 30, 2004 (EP) .................................. 04030997

(51) Int. Cl.
*F04B 49/00*     (2006.01)

(52) U.S. Cl. .................. 417/310; 417/413.1; 60/307

(58) Field of Classification Search .................... 60/282, 60/295, 307; 417/310, 413.1
See application file for complete search history.

(56) References Cited

U.S. PATENT DOCUMENTS

| 1,212,806 | A | 1/1917 | Newton |
| 1,921,895 | A | 8/1933 | Taurisano |
| 2,655,178 | A | 10/1953 | Sarosdy |
| 3,693,656 | A | 9/1972 | Sauer |
| 4,938,254 | A | 7/1990 | Gimby |
| 5,645,804 | A | 7/1997 | Sumiya et al. |
| 5,884,475 | A * | 3/1999 | Hofmann et al. ............... 60/274 |
| 6,187,182 | B1 | 2/2001 | Reynolds et al. |
| 6,192,677 | B1 | 2/2001 | Tost |
| 6,220,296 | B1 | 4/2001 | Ragsdale et al. |
| 6,273,120 | B1 | 8/2001 | Hofmann et al. |
| 6,470,673 | B1 | 10/2002 | van Nieuwstadt et al. |
| 6,695,007 | B2 | 2/2004 | Vicars |

(Continued)

FOREIGN PATENT DOCUMENTS

DE    19946902 A1    4/2001

(Continued)

OTHER PUBLICATIONS

Linder, WO 9011010, Oct. 4, 1990.*

(Continued)

*Primary Examiner* — Charles Freay
*Assistant Examiner* — Christopher Bobish
(74) *Attorney, Agent, or Firm* — Panitch Schwarze Belisario & Nadel LLP

(57) ABSTRACT

The invention relates to a metering pump assembly for admixing a fluid reduction agent into an exhaust gas flow with a metering pump for delivering the reduction agent and with a premixing device, in which in a mixing region, the reduction agent delivered by the metering pump is mixed with a pressurized gas, wherein the metering pump assembly comprises a pump head with a central plate in which at least the metering pump and the premixing device are arranged.

19 Claims, 10 Drawing Sheets

U.S. PATENT DOCUMENTS

| | | | |
|---|---|---|---|
| 6,814,303 B2 * | 11/2004 | Edgar et al. | 239/128 |
| 6,848,251 B2 * | 2/2005 | Ripper et al. | 60/286 |
| 7,017,335 B2 * | 3/2006 | Huber et al. | 60/286 |
| 7,100,366 B2 * | 9/2006 | Hager et al. | 60/286 |
| 7,467,749 B2 * | 12/2008 | Tarabulski et al. | 239/5 |
| 2003/0033799 A1 | 2/2003 | Scheying | |
| 2004/0115074 A1 | 6/2004 | Huber et al. | |
| 2004/0177606 A1 | 9/2004 | Scharsack | |

FOREIGN PATENT DOCUMENTS

| | | |
|---|---|---|
| DE | 19947197 A1 | 4/2001 |
| DE | 10116214 A1 | 3/2002 |
| EP | 1435458 A1 | 7/2004 |
| KR | 10-2002-0033828 | 5/2002 |
| KR | 10-2002-0034199 | 5/2002 |
| KR | 10-2004-0030650 | 4/2004 |
| WO | 00/79108 A | 12/2000 |
| WO | 0123715 A1 | 4/2001 |
| WO | 0125600 A1 | 4/2001 |
| WO | 02/25074 A1 | 3/2002 |
| WO | 0227160 A1 | 4/2002 |
| WO | 02/101209 A1 | 12/2002 |

OTHER PUBLICATIONS

Jochumsen et al.; U.S. Appl. No. 11/813,172; Jun. 29, 2007; Metering Pump Assembly.
Jochumsen et al.; U.S. Appl. No. 11/813,171; Jun. 29, 2007; Dosing Pump Unit.
Int'l Search Report dated Mar. 29, 2006 in Int'l Appln No. PCT/EP2005/014113.
Office Action issued Jul. 31, 2008 in KR Appln. Ser. No. 10-2007-7014552.
Office Action Issued Aug. 22, 2008 in CN Appln. Ser. No. 200580044933.X.
DE19946902 Translation—an automated translation of Bosch (DE19946902) provided by the EPO.
Int'l Search Report dated Apr. 3, 2006 in Int'l Appln No. PCT/EP2005/014111.
Office Action dated Sep. 24, 2009 in U.S. Appl. No. 11/813,172.
Office Action dated Apr. 7, 2010 in U.S. Appl. No. 11/813,172.
Office Action dated Dec. 28, 2009 in U.S. Appl. No. 11/813,171.
Office Action dated Jul. 12, 2010 in U.S. Appl. No. 11/813,171.
Office Action dated Dec. 7, 2010 in U.S. Appl. No. 11/813,171.

* cited by examiner

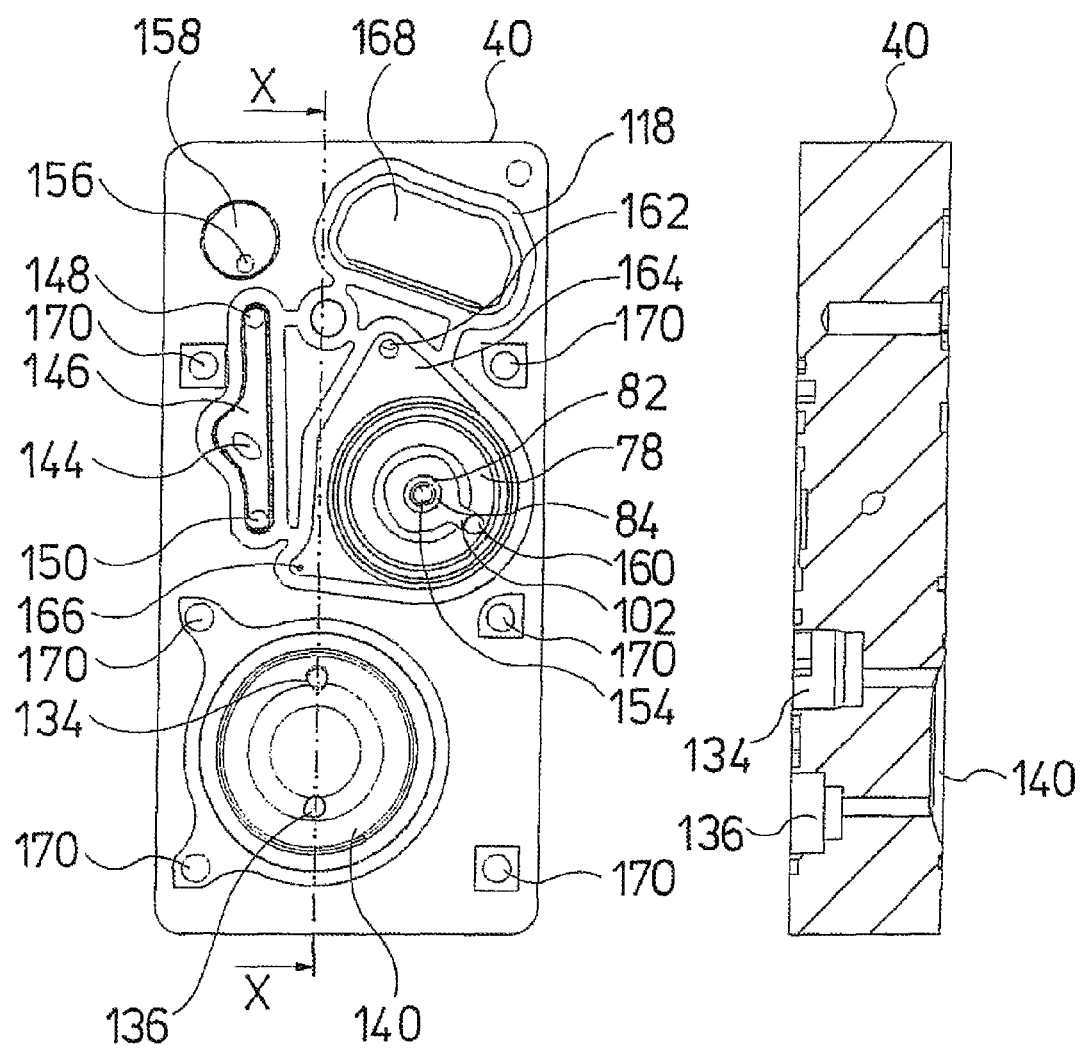

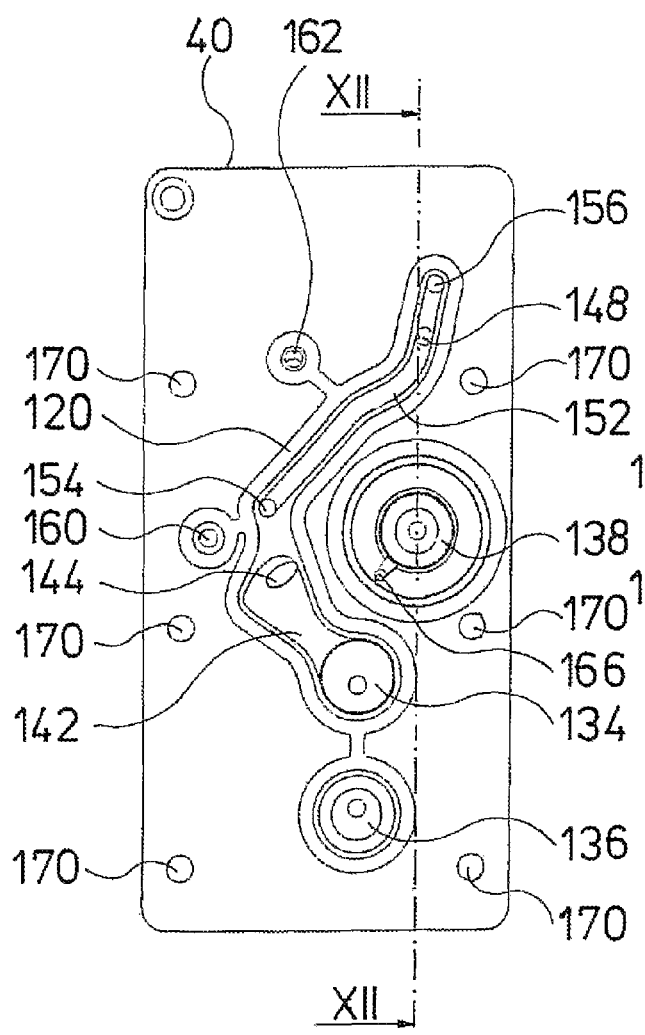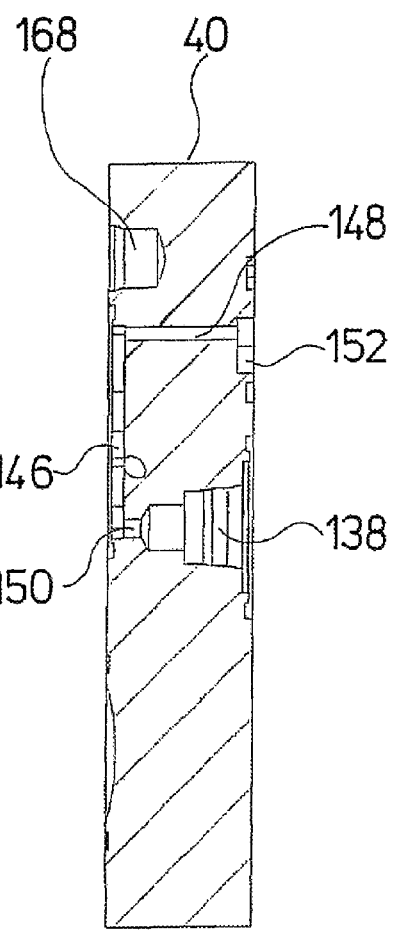

METERING PUMP ASSEMBLY

CROSS-REFERENCE TO RELATED APPLICATIONS

This application is a Section 371 of International Application No. PCT/EP2005/014112, filed Dec. 29, 2005, which was published in the German language on Jul. 13, 2006, under International Publication No. 2006/072444 A1, the disclosure of which is incorporated herein by reference.

BACKGROUND OF THE INVENTION

The invention relates to a metering pump assembly for admixing a fluid reduction agent in an exhaust gas flow.

With auto-igniting internal combustion engines, nitrous oxides arise on operation with excess oxygen, which is the case the majority of operating conditions, and specifically with direct injection into the main combustion space, as is typical with diesel motors. It is known to supply a reduction catalyser to the exhaust gas flow, in order to reduce these nitrous oxide emissions. Usually, an aqueous urea solution as a reduction agent is supplied to the exhaust gas in a finely distributed manner before entry into the catalyser. Thereby, the supplied urea quantity is to be matched as exactly as possible to the combustion process, in order to ensure an as complete as possible reduction within the catalyser, and on the other hand to avoid an excess of urea.

A special metering pump for metering and supplying the reduction agent to the exhaust gas flow is known from EP 1 435 458 A1. With this metering pump, the supplied reduction agent is mixed or subjected to pressurized air in the metering pump assembly before the supply to the exhaust gas flow. The known metering pump assembly, to the outside comprises four connections, specifically for a suction conduit, for a return conduit, for a pressurized air supply as well as for the conduit to an injection nozzle in the exhaust gas system. All essential components for operation of the metering pump and of the premixing device for mixing the reduction agent with pressurized air are integrated into the metering pump assembly.

BRIEF SUMMARY OF THE INVENTION

It is the object of the present invention to provide an arrangement of the hydraulic components and of the hydraulic circuit of such a metering pump assembly, said arrangement being as friendly as possible with regard to assembly, and constructed in a simple manner.

A metering pump assembly achieves this object with the features specified in claim 1. Preferred embodiments are to be deduced from the associated dependent claims, the description, as well as the figures.

The metering pump assembly according to the invention, as an essential component, comprises a metering pump for the metered delivery of the reduction agent. The quantity of the delivered reduction agent, which is supplied to the exhaust gas flow, may be set by way of the activation of the metering pump. The metering pump may for example be designed as a piston- or membrane pump, wherein the delivered reduction agent may be set or metered in an exact manner by way of variation of the number of pump strokes in a certain time interval, and/or the stroke speed. Furthermore, the metering pump assembly comprises a premixing device, in which the delivered reduction agent is subjected or mixed with pressurized gas, in particular pressurized air. Thereby, one does not have to achieve a finely distributed mixing of the reduction agent in the pressurized gas flow, but rather it is sufficient for the reduction agent, for example in the form of larger droplets, to be transported in the pressurized gas flow to an injection nozzle in the exhaust gas flow. A finer distribution of the reduction agent then preferably occurs on injection into the exhaust gas flow. The inventive simple construction of the metering pump assembly is achieved by way of the metering pump assembly comprising a pump head in which the components of the hydraulic circuit are arranged. Thereby, the pump head comprises a central plate, in which at least the metering pump and the premixing device are arranged. In this manner, the metering pump, for example in the form of a membrane pump, and the premixing device, are integrated or mounted into one component, specifically the central plate, by which means the number of the individual parts to be assembled is reduced, and the assembly is simplified. For example, a pump piston may be led in a recess in the central plate, or the membrane of a membrane pump may be attached on the central plate.

Particularly preferably, at least one section of a pressure canal or a pressure conduit from the metering pump to the premixing device is formed in and/or on the central plate. In this manner, one creates an integral connection between the metering pump and the premixing device in the central plate, so that no separate conduit connections to be assembled separately are required. The pressure canal may be designed in the form of through-holes in the central plate, which extend from the one surface to the opposite surface and/or in the form of channels along one or both surfaces. The channels formed in the surface are closed to the outside by way of adjacent plate elements.

Preferably, the central plate with a first surface bears on a bearing surface of a front plate of a drive housing of the metering pump assembly, wherein the front plate carries the drive of the metering pump, preferably on its side which is distant to the central plate. The drive motor and for example a crank drive for the drive of the pump membrane of a membrane pump is arranged in the drive housing of the metering pump assembly. Furthermore, the required control electronics may be arranged in the inside of the drive housing. Preferably, the complete drive is fastened on the side of the front plate distant to the central plate, so that after the assembly of the drive on the front plate, the complete drive may be inserted into the drive housing, which is then closed to the outside by the front plate. Thereby one requires no further fastening of the drive or its components in the inside of the drive housing. Preferably, also all electrical and hydraulic connections are provided on the front plate, so that the remaining drive housing may be designed in a simple manner as a cap, which with its open side, is connected to the front plate. By way of the fact that the central plate with its first surface bears on the front plate of the drive housing in a plane manner, channels formed in the first surface of the central plate as grooves may be closed by the front plate, so that closed conduit connections may be formed between the front plate and the first surface of the central plate. Preferably, sealing elements are arranged between the front plate and the first surface of the central plate for this. Inasmuch as the channels in the first surface of the central plate serve for leading the reduction agent, these are closed or covered to the front plate, preferably in a complete manner, by a sealing element applied between the front plate and the central plate, so that the front plate itself does not come into contact with the reduction agent. This has the advantage that the front plate does not have to be designed resistant to the reduction agent.

Further preferably, an end-plate bears on a second surface of the central plate, said surface preferably being distant to the drive of the metering pump. This end-plate covers the second surface of the central plate, wherein its closes channels formed as grooves in the second surface, so that conduit connections may be formed between the end-plate and the second surface of the central plate. As is also the case between the end-plate and the first surface of the central plate, preferably sealing elements for sealing the formed channels are also arranged between the second surface of the central plate and the end-plate. The central plate is particularly preferably arranged between a front plate of the drive housing and the end-plate. This means that the central plate with its first surface bears on the front plate of the drive housing, and the second opposite surface of the central plate is covered by the end-plate. Bolts are preferably provided, which fix the end-plate on the front plate of the drive housing, and thereby clamp the central plate between the end-plate and the front plate, so that the end-plate, the central plate and the front plate of the drive housing take their bearing in a sealed manner.

As explained, fluid channels for leading the reduction agent and/or the pressurized gas are formed between the first surface of the central plate and the front plate, and/or between the second surface of the central plate and the end-plate. Thereby, one may design additional connections between channels on the first surface and on the second surface, in the form of through-holes through the central plate. It is possible to design all connections between the metering pump and the premixing device as well as connections to a reduction agent tank, to a pressurized gas supply and/or to an injection nozzle in the exhaust gas system, in the inside of the central plate or on its surface by way of this arrangement. In this manner, one avoids conduit connections which are to be assembled in a separate manner, and rather all essential components of the hydraulic circuit may be arranged in or on the central plate, and the required connection channels may be designed integrally on or in the central plate. The central plate may be manufactured as a metal part or preferably as an injection molded part of plastic.

Furthermore, preferably the connections for the supply of reduction agent, i.e. the suction conduit of the metering pump, a return conduit to the reduction agent tank, a pressurized air supply and/or for a conduit to an injection nozzle in the exhaust gas system, are arranged in the end-plate. The connections in the end-plate at the interface of the end-plate to the central plate are in connection with the fluid- or pressurized gas channels formed in the central plate. Thus, by way of assembly of the end-plate, all connections of the metering pump assembly may be simultaneously brought into connection with the hydraulic or pneumatic system in the central plate, which permits a simple assembly of the metering pump assembly.

Further preferably, the metering pump is designed as a membrane pump, and the central plate on its first surface comprises a recess defining the pump volume, which is closed at the first surface by the pump membrane. This means that the membrane is applied into a recess on the first surface of the central plate, which faces the drive housing of the metering pump assembly, and at its side which is distant to the central plate, for its movement, is connected to the drive, i.e. is for example connected to an eccentric- or crank drive, which moves the membrane to and away from the central plate, by which means the pump volume is increased and reduced in size, and a delivery of the reduction agent by the pump volume is achieved.

The membrane pump is furthermore preferably designed such that at least one through-hole extending to the opposite second side of the central plate is formed in the region of the recess in the central plate. This through-hole either forms the suction conduit or pressure conduit to the pump volume. Particularly preferably, two through-holes are provided, one which forms the suction conduit and one which forms the pressure conduit or the pressure channel. Such an arrangement may for example also be applied to a piston pump.

Preferably, in each case a return valve is arranged in the through-hole or the through-holes which lead from the second surface to the recess in the first surface. Return valves are required with a piston- or membrane pump, in order to achieve a pump procedure. Thereby, the two return valves are arranged such that they open in the same flow direction, i.e. in the delivery direction of the metering pump. Preferably, both return valves required for the operation of the metering pump are in each case arranged in a through-hole of the central plate. The first return valve closes the suction conduit during the pump stroke, the second return valve closes the pressure conduit on suctioning, so that no delivered reduction agent may flow back out of the pressure conduit into the pump volume. The return valves are integrated into the central plate by way of the arrangement of the return valves in the through-holes, by which means a more compact construction and a simple assembly is achieved.

A through-hole extending in the region of the recess to the opposite second surface preferably forms a pressure channel which connects to the metering pump at the exit side and which is connected to the premixing device as well as to a return valve arranged in the central plate. The reduction agent delivered by the metering pump reaches the premixing device via the pressure channel or the pressure conduit, and this premixing device is likewise integrated into the central plate and in which the reduction agent is mixed the pressurized air. Furthermore, the pressure channel is also connected to a return valve which selectively closes or releases a return conduit or a return channel. The return channel is in connection with a connection for connection to the reduction agent tank, so that reduction agent delivered by the metering pump may be pumped back into the reduction agent tank via the return channel. Thus, by way of opening the return valve on starting operation of the metering pump assembly, one may first ensure that the metering pump and the pressure channel connecting to this are firstly completely filled with reduction agent. The construction is simplified further since the return valve is also integrated into the central plate.

Particularly preferably, the return valve may be actuated by pressurized gas and connected to a pressurized gas entry via a flow path formed in the central plate and/or on at least one surface of the central plate. In this manner, one may do away with electrical actuation means for actuating the return valve, and rather, it is possible to effect the actuation alone by way of the hydraulic- or pneumatic circuits in the inside of the central plate. For this, the actuation conduit, for impinging the return valve with pressure, is realized completely in or on the central plate in the form of through-holes or grooves formed in the surface.

The return valve is preferably inserted into a recess formed on the second surface of the central plate, i.e. the surface which is distant to the drive housing, and is preferably designed as a membrane valve. This means, a membrane may be provided which is impinged with pressurized air or pressurized gas and by way of this, is moved such that it closes or releases a flow passage, for example an opening in the central plate, so that the return channel to the reduction agent tank is opened or closed.

Usefully, the premixing device is connected to a pressurized gas entry via a flow path formed in the central plate and/or on at least one surface of the central plate. Thus the pressurized gas supply to the premixing device is also integrated into the central plate.

Further preferably, a pressurized gas entry which is connected to a switch valve for opening and closing the pressurized gas entry, is formed on the central plate or a plate bearing on one of the surfaces of the central plate, i.e. for example of the end-plate or a front plate of the drive housing. Thereby, the switch valve may likewise be integrated into the central plate or however be formed in or on a plate bearing on the central plate. The pressurized gas entry particularly preferably forms a central compressed gas entry, so that the complete supply of pressurized gas for the metering pump assembly may be released or cut off by the switch valve. In particular, the premixing device as well as the return valve actuated by pressurized gas are connected to the central pressurized gas entry, so that the pressurized gas supply to the premixing device may be released, and the return valve may be actuated, by way of actuation of the switch valve.

The pressure channel is preferably in connection with a pressure sensor arranged in the central plate. The pressure sensor may act in an electrical, but also hydraulic, pneumatic or mechanical manner and detect the fluid pressure in the pressure channel. Preferably, a switch valve for the pressurized air supply and/or the return valve in a reduction agent return to the reduction agent tank are actuated in dependence of the output signal of the pressure sensor. Since the regulation- or control electronics of the metering pump assembly are preferably arranged protected in the inside of the drive housing, the pressure sensor in the central plate is preferably arranged such that the electrical connection leads of the pressure sensor on the surface facing the drive housing, exit from the central plate and may thus be led directly into the inside of the drive housing. Preferably, a recess is formed in the front plate of the drive housing, through which the pressure sensor may be inserted from the side of the front plate which faces the inside of the drive housing, into this front plate, and the central plate attached to the front plate. Thus the pressure sensor alone may be assembled on the front plate of the drive housing, so that no connection to further housing parts is necessary.

Particularly preferably, the central plate comprises a recess for a heating element, preferably on the surface facing a drive housing. Thus the hydraulic components in the inside of the central plate may be heated in order to prevent a freezing of the reduction agent in the metering pump assembly at low temperatures. Preferably, the central plate is designed of metal, so that the heat produced by the heating element is well conducted to all parts of the hydraulic system of the metering pump assembly. The electrical connections of the heating element are also preferably led out of the central plate directly through the front plate of the drive housing into the inside of this housing, so that there, they may be connected to the electrical connection elements or a control of the metering pump assembly.

With the described arrangement, the movement directions of all moving valve elements which are arranged in the central plate, are preferably directed parallel to one another and preferably parallel to the movement direction of a pump membrane. These valve elements are for example the return valves in front of and behind the metering pump, return valves in the pressure conduit in front of the premixing device, in the pressurized gas supply to the premixing device and/or the return valve. The movement direction extends preferably transversely to the first and second surface of the central plate, so that the valve elements may be inserted in their movement direction into recesses of the central plate. This permits a simple assembly and a compact construction of the central plate with the valve elements arranged therein.

The premixing device preferably comprises a housing part which defines a mixing chamber and which is inserted into a recess on a surface preferably distant to a drive of the metering pump, of the central plate. This is the side which preferably faces an end-plate in which the connections for the connection of the metering pump assembly are formed. Thus the conduit leading to the exhaust gas system and through which the reduction agent/pressurized gas mixture is lead away from the metering pump assembly, may directly face the premixing device.

When in the preceding description, it is stated that fluid channels in particular for the reduction agent and the pressurized gas are formed in the surfaces of the central plate, then this is to be understood that the channels are in particular formed between the surfaces of the central plate and the adjacent plate elements. This means that the grooves defining the channels may also be completely or partly formed in the plate elements bearing on the central plate.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 9 is a plan view of the surface of the central plate which faces the drive housing;

FIG. 10 a sectioned view of the central plate along line X-X in FIG. 9;

FIG. 11 is a plan view of the surface of the central plate distant to the drive housing and FIG. 12 is a sectioned view of the central plate along line XII-XII in FIG. 11.

DETAILED DESCRIPTION OF THE INVENTION

Figure 1:
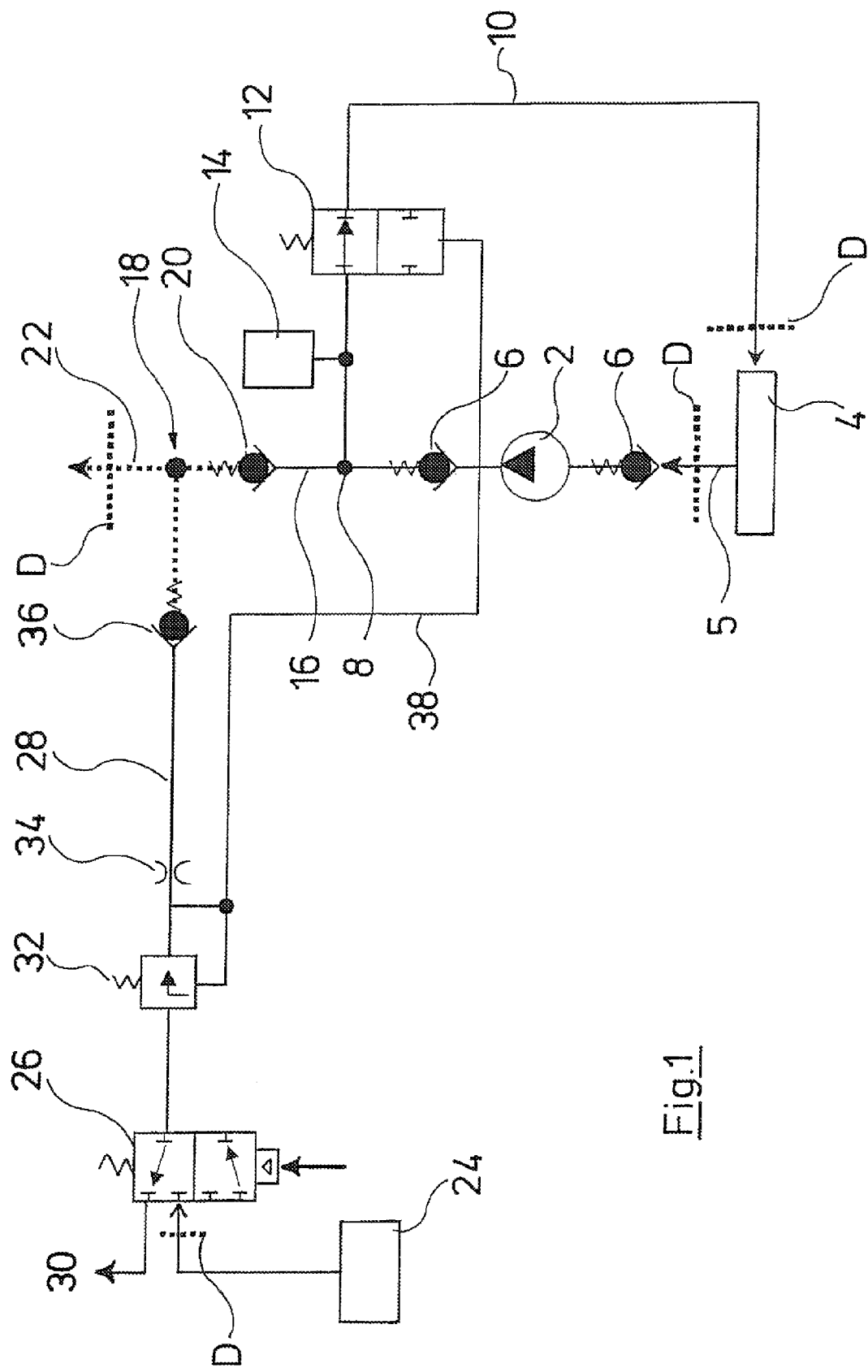
FIG. 1 is a circuit diagram of the hydraulic components of a metering pump assembly according to the invention.

Firstly, the basic function of one embodiment example of a metering pump assembly according to the invention is described by way of the circuit diagram in FIG. 1.

The main item of the metering pump assembly is a metering pump 2 which is designed as a membrane pump, with an associated drive. The quantity of the reduction agent delivered by the metering pump 2 may be set by way of the control of the drive, and in particular the control of the number of pump strokes, in order to be able to adapt the reduction agent quantity exactly to the demand on account of currently running combustion process in the motor. An aqueous urea solution is preferably used as a reduction agent. The reduction agent is kept ready in a reduction agent tank 4, out of which it is suctioned via a suction conduit 5 by the metering pump 2. In the known manner, in each case one return valve 6 is arranged in front of and behind the metering pump 2 in the shown example, and these valves are an essential constituent of the membrane pump. Thus the return valve 6 which is situated in front of the pump in the flow direction ensures that the reduction agent is not delivered back into the reduction agent tank 4 given a pump stroke. The return valve 6 which lies downstream of the metering pump 2 in the flow direction conversely ensures that with a suctioning, only reduction agent is suctioned out of the reduction agent tank 4, and is not suctioned back out of the pressure conduit.

A return conduit 10 branches at a branching point 8 downstream of the metering pump 2 and the second return valve 6, and leads back to the reduction agent tank 4 and serves for bleeding the system on starting operation of the metering pump 2.

An interruption- or shut-off valve 12 is arranged in the return conduit 10, by way of which the return conduit 10 may be closed, so that no reduction agent may flow back through the return conduit 10 to the reduction agent tank 4. In the idle condition shown, the shut-off valve 12 is located in the opened condition, in which the return conduit 10 is released. A pressure sensor 14 which detects the fluid pressure in front of the shut-off valve 12 and thus downstream of the metering pump 2 in the pressure conduit 16, is arranged in the return conduit 10 upstream of the shut-off valve 12 and downstream of the branching point 8.

The pressure conduit 16 leads from the metering pump 2 via the branching point 8 to the mixing region or the mixing chamber 18, to a device means in which the reduction agent is impinged or mixed with pressurized gas, in this case pressurized air. A return valve 20 which by way of biasing, for example a spring, is held in the shown idle position in a closed position and prevents a return flow of reduction agent, and in particular of pressurized gas from the mixing region 18 into the pressure conduit 16, is arranged directly in front of the mixing region 18 in the pressure conduit 16, i.e. at the end of the pressure conduit 16. A conduit 22 which leads to the injection nozzle in the exhaust gas system of the motor vehicle connects downstream of the mixing region 18 in the flow direction.

The pressurized air used in this example as pressurized gas is prepared by a pressurized air supply 24 of the motor vehicle. Such pressurized air supply systems are usually present in lorries, in particular for actuating the brakes. The shown metering pump assembly is connected to this central pressurized gas supply 24, wherein the metering pump assembly at the entry side comprises a solenoid or magnet valve 26 which selectively connects the pressured air conduit 28 which leads to the mixing region 18, to the pressurized air supply 24 or opens it to the atmosphere 30. The electrically actuated magnet valve 26 is biased such that it is held in its idle condition in the shown position, in which the pressurized air conduit 28 is open to the atmosphere 30.

In the pressurized air conduit 28, a pressure regulator 32 is arranged downstream of the magnet valve 26 in the flow direction, and a throttle 34 is arranged downstream of this pressure regulator.

The pressurized air conduit at the mixing chamber or the mixing region 18 ends in a return valve 36, which is biased such that it is closed in the shown idle condition and may be opened against its biasing by the pressure acting in the pressurized air conduit 28. It is thus ensured that the return valve 36 is always closed when no pressurized air flows out of the pressurized air conduit 28 into the mixing chamber 18, so that no reduction agent from the mixing region 18 may penetrate into the pressurized air conduit 28.

The shut-off valve 12 in the return conduit 10 is actuated by pressurized air and is connected to the pressurized air conduit 28 via an actuation conduit 38, wherein the actuation conduit 38 is in connection with the pressurized air conduit 28 between the pressure regulator 32 and the throttle 34. The actuation conduit 38 ensures that when the magnet valve 26 is switched over, so that the pressurized air conduit 28 is in connection with the pressured air supply 24, the actuation conduit 38 is also set under pressure. The air pressure prevailing in the actuation conduit 38 then effects a switch-over of the shut-off valve 12 against its biasing, so that the return conduit 10 is closed.

The previously described elements which lie within the boundary indicated in FIG. 1 by dashed lines D, i.e. in particular the metering pump 2, the shut-off valve 12, the magnet valve 26, the mixing point 18, the return valves and the conduits connecting these components, are all integrated in the metering pump assembly, so that the metering pump assembly, apart from the electrical connections, has only four fluid connections to the outside, specifically for connection to the pressurized air supply 24, for connection of the conduit 22 leading to the injection nozzle, for the connection of the suction conduit 5 leading to the reduction agent tank 4, and for connection of the return conduit 10 to the reduction agent tank 4.

On starting operation of the system, the magnet valve 26 firstly remains in its closed, idle condition (shown position), in which the pressurized air conduit 28 is separated from the compressed air supply 24. Firstly, the metering pump 2 is set into operation, which suctions reduction agent out of the reduction agent tank 4 via the suction conduit 5. The biasing of the return valve 20 in the shown, closed position, is selected such that the pressure in the pressure conduit 16 is not sufficient to open the return valve against the biasing, given an open return conduit 10.

Since no pressure prevails in the pressurized air conduit 28 at first, the actuation conduit 38 is also firstly without pressure, so that the shut-off valve 12 remains in its opened, idle position and the return conduit 10 is opened. In this manner, the metering pump 2 firstly delivers reduction agent from the reduction agent tank 4 and via the branching point 8 through the return conduit 10 back into the reduction agent tank 4. This serves for bleeding the system on starting operation, i.e. of firstly ensuring that the pressure conduit 15 is completely filled with reduction agent.

When the pressure conduit 16 and the return conduit 10 are completely filled with reduction agent, the fluid pressure in the pressure conduit 16 and in the return conduit 10 upstream of the shut-off valve 12 reaches a certain limit value, which is detected by the pressure sensor 14. When this limit value is detected by the pressure sensor 14, a control switches over the magnet valve 26, so that the pressurized air conduit 28 is supplied with pressurized air via the pressurized air supply 24 of the lorry. The actuation conduit 38 is also impinged with pressure by way of this, by which means the shut-off valve 12 is switched over against the spring biasing, and the return conduit 10 is closed in this manner. Since the pressure conduit 16 is no longer open to the reduction agent tank 4 via the return conduit 10, the fluid pressure on further operation of the metering pump 2 increases in the pressure conduit 16 to such an extent, that the pressure is enough to open the return valve 20 against its spring biasing, so that the reduction agent may flow into the mixing region 18 and there is impinged with pressurized air from the pressurized air conduit 28. Pressurized air and reduction agent then together flow through the conduit 22 to an injection nozzle in the exhaust gas conduit of the lorry.

The quantity of supplied reduction agent may be set on operation, via the number of pump strokes of the metering pump. The pressurized air flow through the pressurized air conduit 28 into the mixing region 18 is thereby constant.

If the installation is taken out of operation, in particular when turning the vehicle off, firstly the metering pump 2 is switched off, so that reduction agent is no longer delivered from the reduction agent tank 4. By way of this, the pressure in the pressure conduit 16 reduces to such an extent that the return valve 20 closes due to its biasing, and prevents further reduction agent from penetrating into the mixing region 18. Since the magnet valve 26 at first continues to be open, pressurized air continues to flow through the return valve 36 into the mixing region 18 and there flushes out the remainder of the reduction agent which is still present there, via the conduit 22.

When the magnet valve 26 is closed by switching off the supply of current, the pressurized air flow through the pressurized air conduit 28 and the return valve 36 is also cut off, so that the whole system is stopped in operation. In this condition, the shut-off valve 12 switches back into its idle condition again, i.e. the return conduit 10 is opened.

It is ensured by way of the arrangement of the return valve 20, that no air from the mixing chamber or the mixing region 18 may penetrate into the pressure conduit 16. Thus a crystallization of the reduction agent in the pressure conduit 16 may be prevented. Since furthermore, the mixing region 18 is automatically flushed on account of the constant pressurized air flow after switching off the metering pump 2, one may also prevent a crystallization of reduction agent in the mixing region 18 and in the conduit 22 which connects to this.

The pressure sensor 14 which preferably emits an electrical signal, apart from detecting the complete bleeding of the pressure conduit 16, also serves for recognizing further undesirable operating conditions. Thus a blocked return conduit 10 may be recognized by the pressure sensor 14, specifically when, given an opened shut-off valve 12, the pressure exceeds a predefined limit value which may normally not occur given an opened return conduit 10. Furthermore, the pressure sensor 14 may also detect that the injection nozzle in the exhaust gas conduit of the vehicle is blocked. Then specifically, the pressure in the pressure conduit 16 given an opened magnet valve 26 likewise increases beyond a predefined limit value, which may not normally occur when the injection nozzle is functioning in a correct manner. Furthermore, one may also detect that the reduction agent tank 4 is empty via the pressure sensor 14. Then, specifically on operation, the pressure in the pressure conduit 16 reduces below a predefined limit value which may not normally occur in normal operation given a closed return conduit 10.

Hereinafter, an exemplary construction of the premixing device consisting essentially of the mixing region 18 and the return valves 20 and 36 is described by way of FIGS. 2 to 5.

Figure 2:
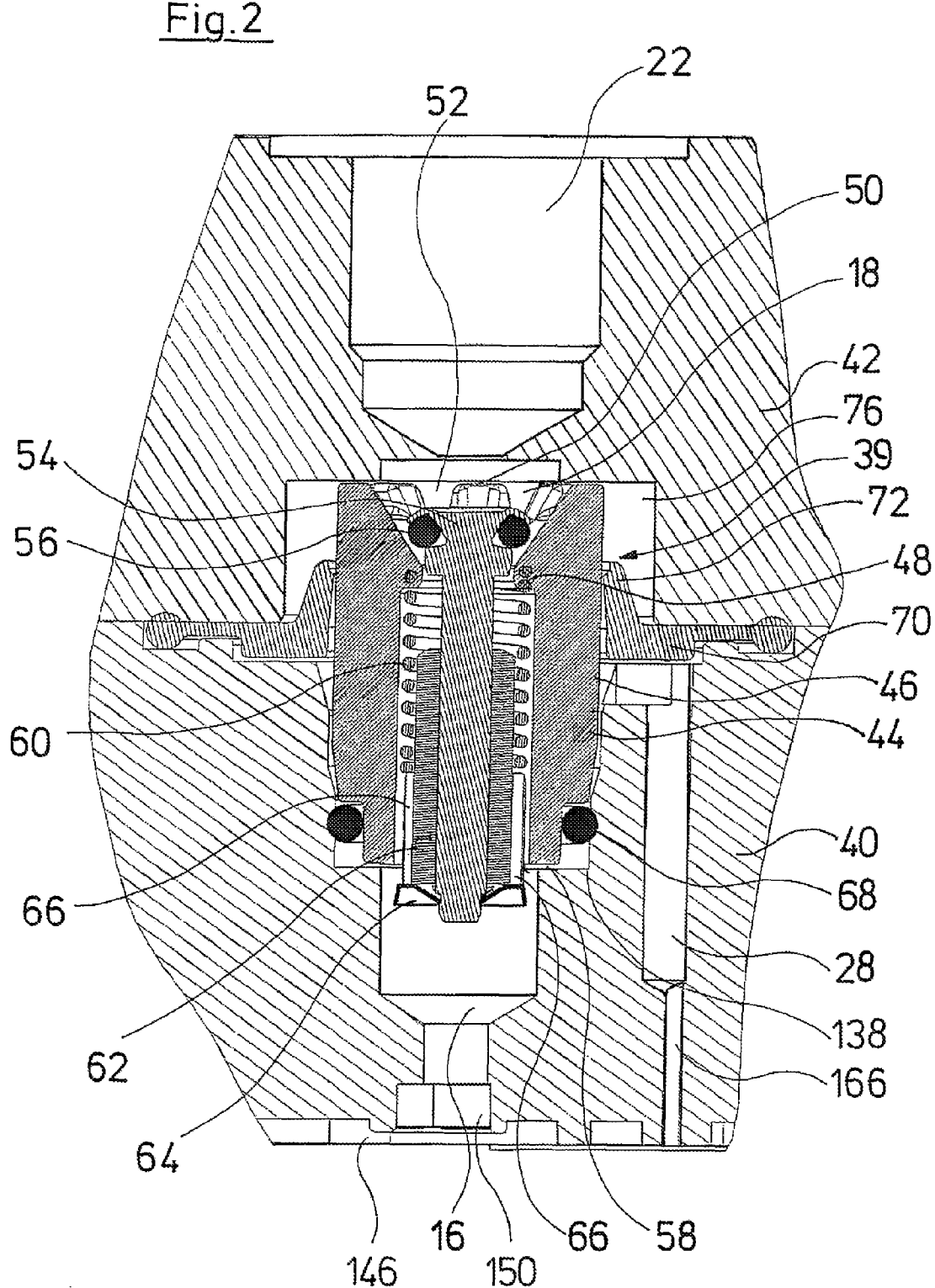
FIG. 2 is a sectioned cut-out, the premixing device of a metering pump assembly according to FIG. 1.

FIG. 2 shows a sectioned view of the premixing device 39 in a condition installed in a pump head. The pump head is formed essentially by a central plate 40 and an end-plate 42 which bears on this, wherein flow channels are formed, and the premixing device 39 arranged between the plates 40 and 42.

The conduit 22 in the end-plate 42 is designed as a connection, to which a fluid conduit which leads to an injection nozzle in the exhaust gas system of the vehicle, may be connected. The pressure conduit 16 as well as the pressurized air conduit 28 in the form of channels in the surface and through-holes connecting thereto, are formed in the central plate 40.

The premixing device furthermore, as a central component, comprises a cylindrical casing 44 with a cylindrical outer wall 46. A necking 48 is formed in the inside of the casing 44, and this necking divides the inner space of the casing 44 into two parts. The first part of the inner space, proceeding from the necking 48, widens in a funnel-like manner towards a first end-side 50 of the casing 44. This region is the actual mixing region 18 or the mixing chamber 18 of the premixing device 39. Recesses or openings 52 are formed in the peripheral wall of the mixing region 18 distributed uniformly over the periphery, and these serve as entry openings for the pressurized air. The opening surrounded by the necking 48, in the inside of the casing 44, serves as an entry opening for the reduction agent into the mixing region 18. This region is closed by a piston 54 with an O-ring 56 applied into a peripheral groove. Thereby, the O-ring 56, as shown in the FIGS. 3 and 4, may come to bear on the funnel-like inner wall of this mixing region 18 in the inside of the casing 44, in a sealing manner.

The piston 54 extends with a piston rod 55 through the necking 48 into the second region in the inside of the casing 44, to the second end-side 58 which is distant to the first end-side 50. A compression spring which is supported with a first end on the necking 48, is arranged in the second part of the inner space of the casing 44. The opposite end of the compression spring 60 which is designed as a helical spring, bears on a guide casing 62 surrounding the piston rod 55, on a shoulder facing the necking 48. The guide casing 62 guides the piston rod and thus the piston 54 in the inside of the casing 44, in that it bears on the inner wall of the casing 44. The guide casing 62 is supported via a spring ring 64 on the longitudinal end of the piston rod 55 which is distant to the piston 54. Thus the compression spring 60 presses the piston rod 55 in the direction of the second end-side 58 of the casing 40, so that the piston 54 with the O-ring 56 is pressed against the funnel-like or conical inner wall of the mixing region 18. In this manner, the piston 54 which forms the return valve 20 in FIG. 1, is held in its idle position in the closed condition, as is shown in the FIGS. 3 and 4.

The guide casing on its outer periphery comprises longitudinal grooves 66 (not shown in the FIGS. 3 to 5), by way of which reduction agent may flow through the pressure conduit 16 into the inside of the casing 44 to the necking 48. One prevents the reduction agent from being able to flow past the casing 44 at the outside, by way of the O-ring 58 surrounding the casing 44 at the outside. In the inserted condition, the O-ring 68 seals the outer wall of the casing 44 to the inner wall of a recess, in which the casing 44 is arranged in the central plate 40.

The fluid pressure in the pressure conduit 16 in the inside of the casing 44 acts on the piston 54 in the direction of the longitudinal axis of the piston rod 55. With an adequately high fluid pressure in the pressure conduit 16, the force acting due to the pressure on the piston 54 exceeds the spring force of the compression spring 60, so that the piston 54 with the piston rod 55 is displaced in the direction of the first end-side 50 of the casing 44, and the piston 54 with the O-ring 56 lifts from the conical inner wall of the mixing region 18, as shown in the FIGS. 2 and 5. Thus, an annular gap between the piston 54 or the O-ring 56 and the surrounding inner wall of the casing 44 or of the mixing region 18 arises, through which the reduction agent may flow into the mixing region 18.

The second return valve 36 of the premixing device 39 is formed by an annular elastic collar 70 which is clamped between the central plate 40 and the end-plate 42. Thereby, in particular a thickened region on the outer periphery of the collar 70 comes to bear on the central plate 40 as well as the end-plate 42, so that the compressed air from the pressurized air conduit 28 may not flow past the outer periphery of the sleeve 70.

Figure 3:
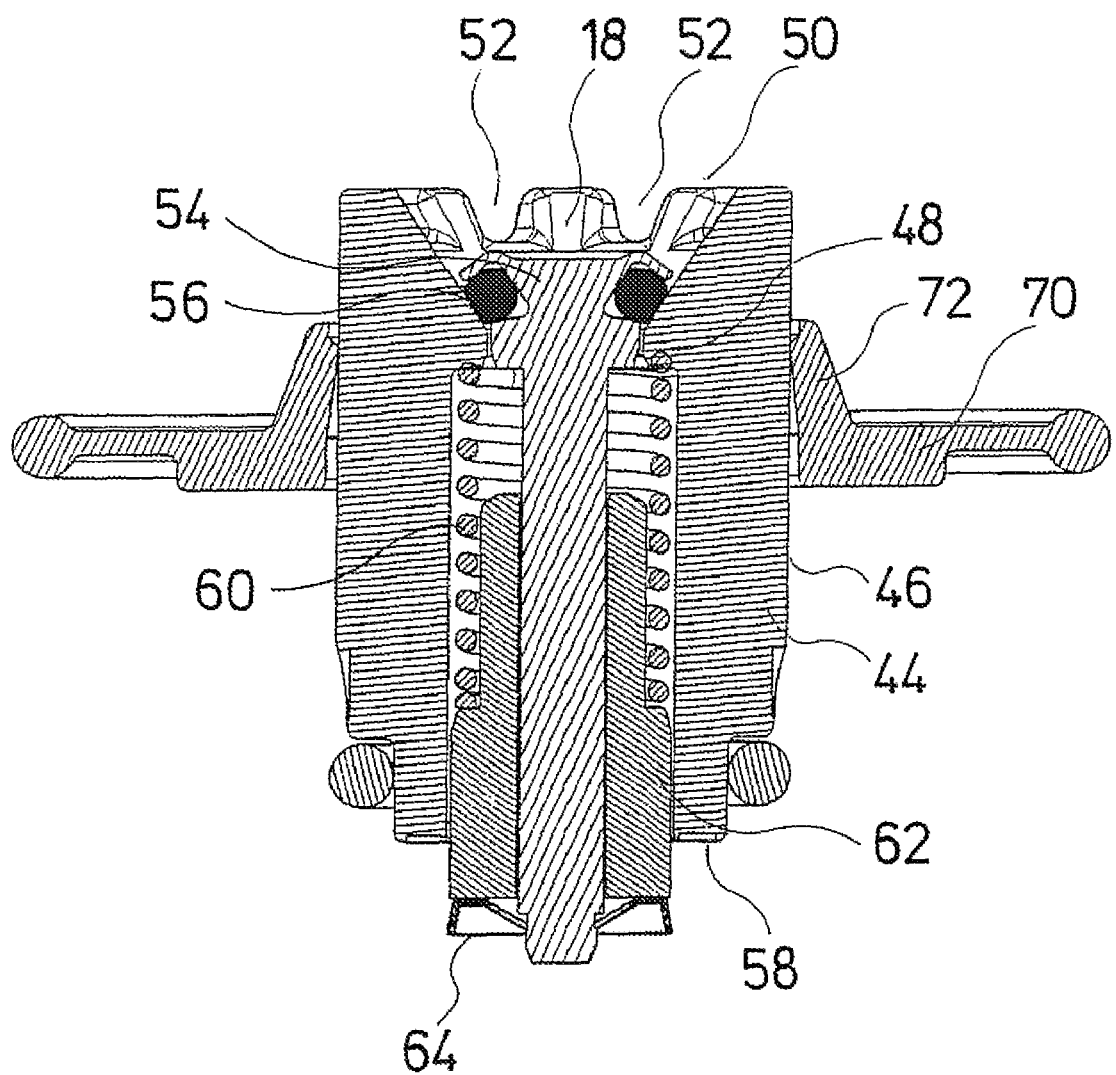
FIG. 3 is a separate sectioned view, the premixing device according to FIG. 2, with closed return valves.
Figure 4:
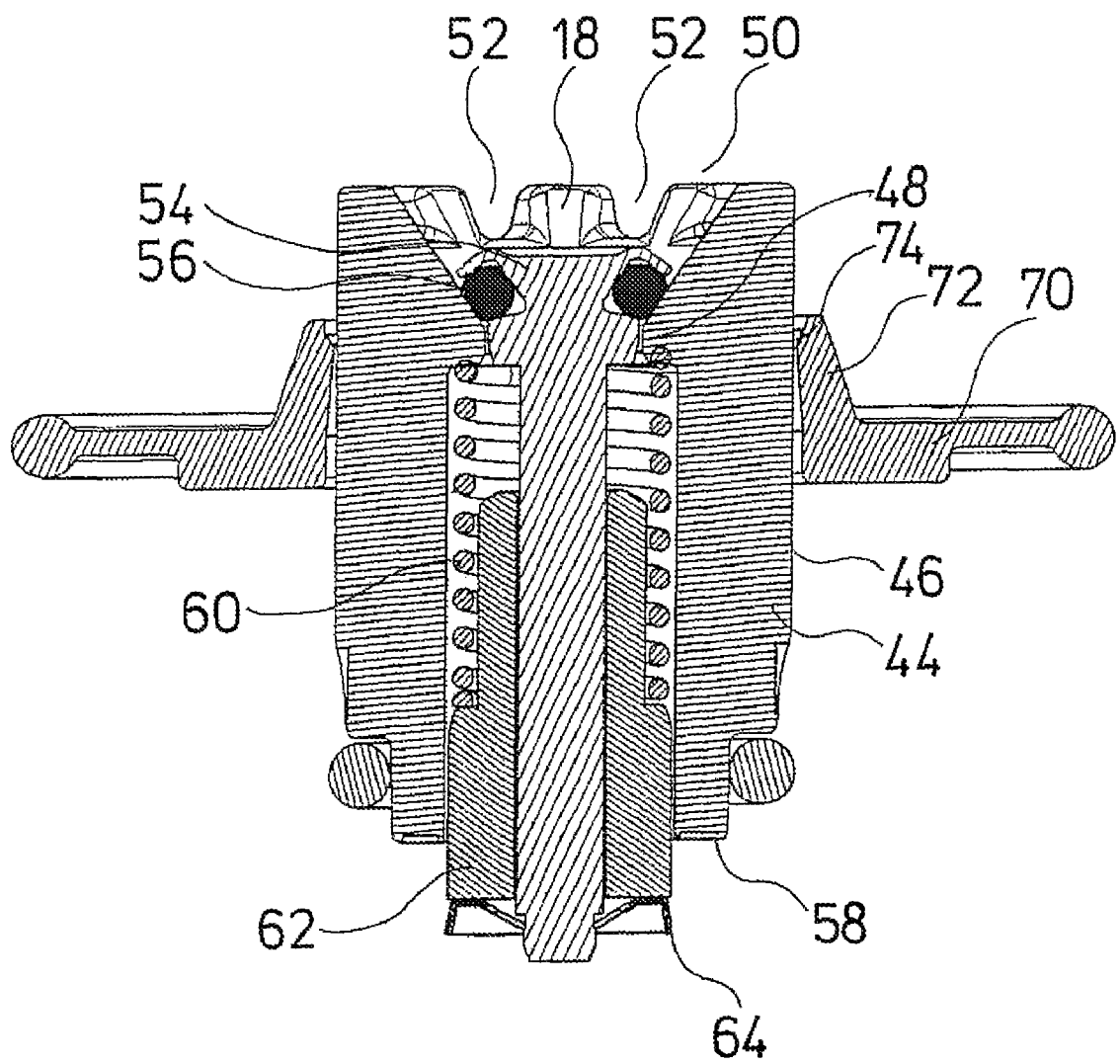
FIG. 4 is the premixing device according to FIG. 3, with an opened return valve for the supply of pressurized gas.
Figure 5:
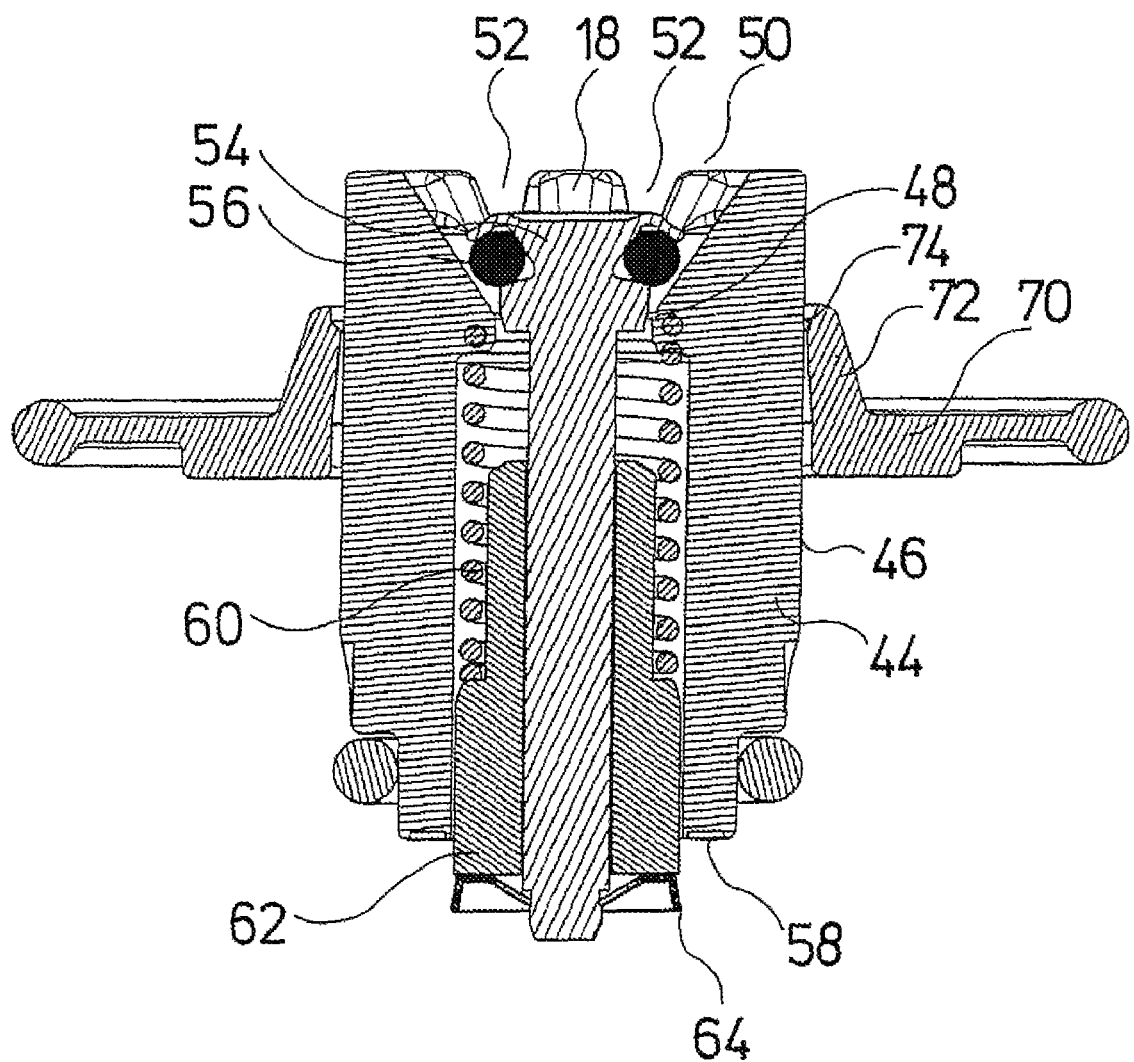
FIG. 5 is the premixing device according to FIGS. 3 and 4 with an opened return valve for the supply of reduction agent, and an opened return valve for the supply of pressurized gas.

The sleeve 70 on its inner periphery is extended in a casing-like manner in the axial direction towards the end-side 50 of the casing 44, so that a collar 72 is formed. This collar 72 extends in a slightly conically inclined manner to the outer wall 46 of the casing 44, and comes to bear on this with its free terminal end. Thereby, the sleeve 70 or the collar 72 are formed in an elastic manner, such that the collar in its idle position is sealingly held on the outer wall 46 of the casing 44 as is shown in FIGS. 2 and 3.

If pressurized air is introduced into the pressurized air conduit 28, the pressurized air in the central plate 40 firstly at the outer periphery 46 flows around the complete casing 44, since the recess accommodating the casing 44, in the central plate 40, is formed larger in the region distant to the pressure conduit 16 than the outer diameter of the casing 44. The compressed air then flows into the region between the collar 72 of the sleeve 70, and the outer wall 46 of the casing 44, wherein the collar 72 is pressed away from the outer wall of the casing 46 by the air pressure, so that an annular gap 74 arises between the outer wall 46 and the inner periphery of the sleeve 70 or of the collar 72, through which the compressed air may flow into the recess 76 in which the casing 44 is arranged in the end-plate 42. The pressurized air then flows from the recess 46 through the recesses or openings 52 into the mixing region 18 and from there, together with the supplied reduction agent, through the conduit or the connection 22 further to the injection nozzle in the exhaust gas system of the vehicle.

When the supply of pressurized air in the pressurized air conduit 28 is switched off, the sleeve 70 with its collar 72 on account of its elasticity again sealingly bears on the outer wall 46 of the sleeve 44. On account of the collar 72 of the sleeve 70 projecting into the recess 76, one further succeeds in a greater pressure in the recess 76 pressing the casing-like extension or the collar 72 of the sleeve 70 even more strongly against the outer wall 46, and thus securely closing the return valve 36.

The recesses or openings 52 are designed such that they extend in the longitudinal direction of the casing 44 up to the outer side of the piston 54. Furthermore, recesses 52 are shaped such that they widen towards the inside of the casing 44, i.e. towards the mixing region 18. By way of this, one succeeds in pressurized air which flows through the recesses 52 into the mixing region 18, completely flowing over the whole mixing region 18 at its inner wall and in particular also the outer side of the piston 54, so that reduction agent residues may be completely flushed out of the mixing region 18.

Figure 6:
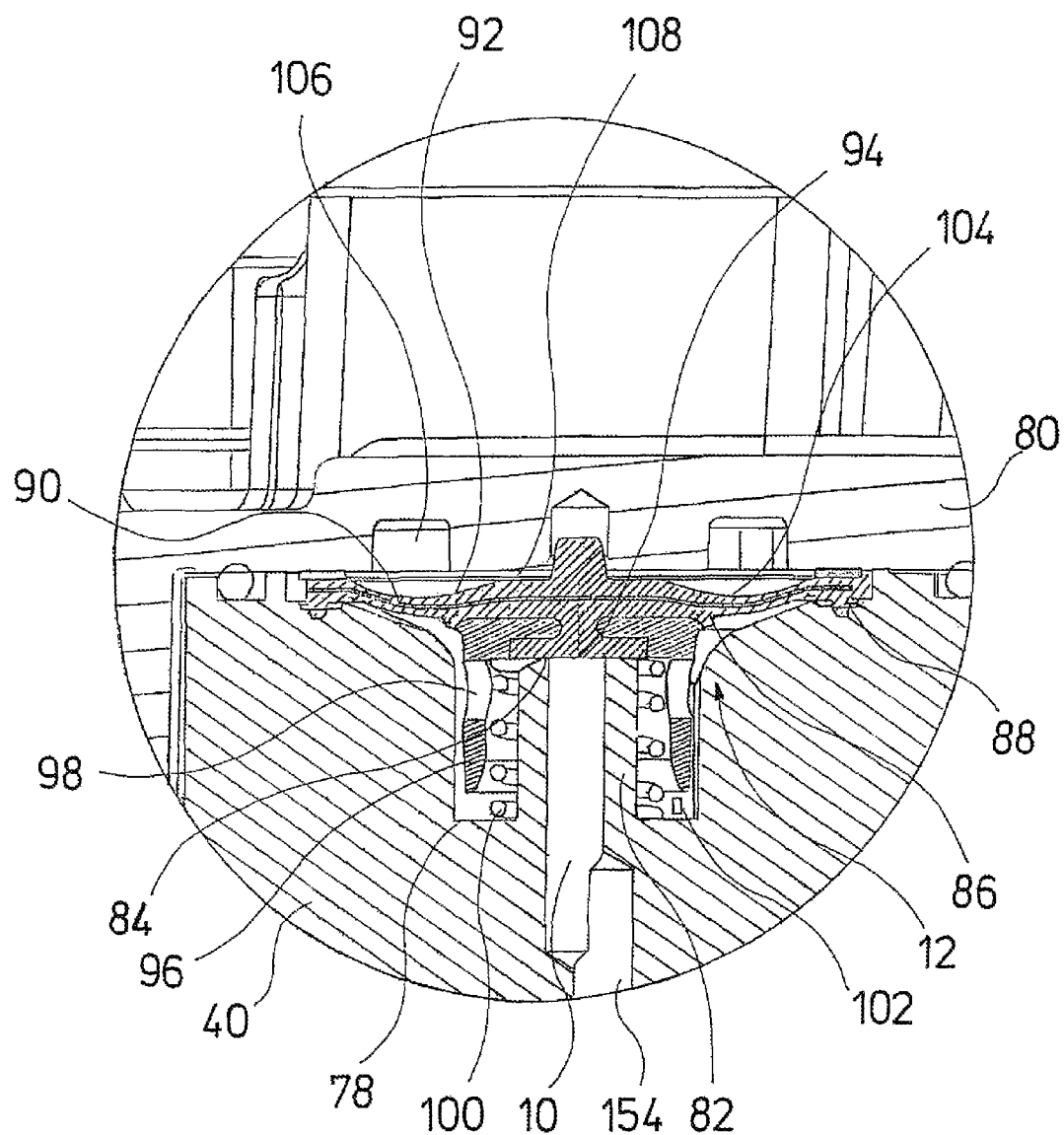
FIG. 6 is a sectioned view of the shut-off valve in the return conduit, in the closed condition.
Figure 7:
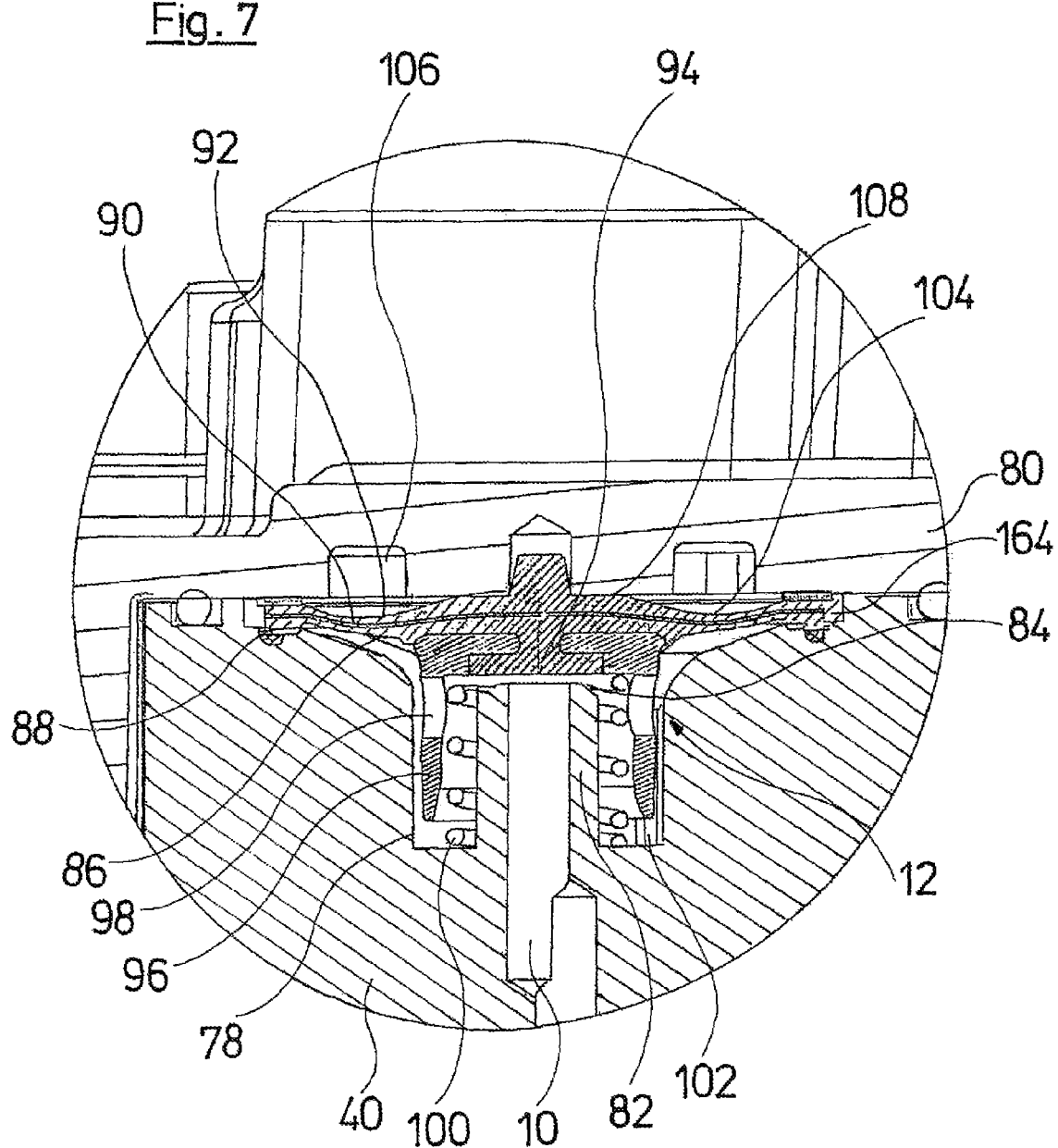
FIG. 7 is a sectioned view of the shut-off valve according to FIG. 6 in the opened condition.

The construction of the shut-off valve 12 is described in the following in more detail by way of FIGS. 6 and 7. The shut-off valve 12 is arranged in the central plate 40 in a recess 78. The recess 78 is formed in the surface of the central plate 40 which is distanced to the end-plate 42, and is closed by the front plate 80 of a drive housing of the metering pump assembly, to which the central plate 40 is attached in a flat manner.

The recess 78 on its base is formed in a cylindrical manner and opens in a funnel-like manner towards the front plate 80. An inlet stub 82 extends centrally in the cylindrical section from the base of the recess 78, into the recess 78. The return conduit 10 branching from the pressure conduit 8 runs in the inside of the inlet stub 82, i.e. concentrically to this, so that it is opened to the end-side of the inlet stub 82. The end-side of the inlet stub 82 distant to the base of the recess 78 thus forms a valve seat 84, on which a valve element 86 designed in a membrane-like manner sealing bears in the closed condition which is shown in FIG. 6. The valve element 86 is designed as a circular membrane which is held at its outer periphery 88 between the surfaces of the central plate 40 and the front plate 80, said surfaces being adjacent one another. The central region of the valve membrane 86 may be moved in the extension direction of the inlet stub 82 with respect to the periphery 88, which is ensured by the elasticity of the membrane.

The valve membrane or the valve element 86 comprises a carrier 90, which is enclosed or peripherally injected by an elastic material 92 which also defines the sealing surface 94 coming to bear on the valve seat 84.

Surrounding the sealing surface 94, a guide casing 96 which on its peripheral wall comprises openings 98, proceeding from the valve element 86, extends concentrically to the inlet stub 82. The guide casing 96 is integrally connected to the elastic material 92 and via this to the carrier 90 of the valve element 86. Preferably, the carrier 90 and the guide casing 96 are peripherally injected with the elastic material 92 and thus connected to one another with a positive fit.

A compression spring 100 in the form of a helical spring is arranged or guided in the inside of the guide casing 96, so that the compression spring 100 extends parallel to the longitudinal axis of the inlet stub 82 between its outer periphery and the inner periphery of the guide casing 96. The compression spring 100 is supported with a longitudinal end on the base of the recess 78 and with the opposite longitudinal end on the valve element 86 at the periphery of the sealing surface 94. The compression spring 100 is dimensioned such that it presses the valve element 96 into its opened position, i.e. its position distanced to the valve seat 84, which is shown in FIG. 7. In this position of the shut-off valve 12 shown in FIG. 7, the reduction agent which is delivered by the metering pump into the return conduit 10, will flow through the inlet stub 82 and through the annular gap between the sealing surface 94 and the valve seat 84, into the inside of the guide casing 96. The reduction agent may flow into the recess 78 through the opened end-side distant to the valve element 86 as well as the openings 98 of the guide sleeve 96. The reduction agent flows from the recess 78 through a channel 102 opening out at the periphery of the recess 78, to a connection stub of the metering pump assembly, and from there further through a return conduit to the reduction agent tank 4.

In order to close the shut-off valve 12, the membrane-like valve element 86 is impinged from its side distant to the inlet stub 82 with pressurized air from the pressurized air conduit 28 via the actuation conduit 38. The air pressure acting on the surface 104 of the valve element 86 moves the valve element 86 against the spring force of the compression spring 100 in the direction of the longitudinal axis of the inlet stub 82 to this stub, so that the valve element 86 with its sealing surface 94 comes to sealingly bear on the valve seat 84. In this condition shown in FIG. 6, no reduction agent may flow out of the inlet stub 82 into the inside of the recess 78, so that the return conduit 10 is closed or interrupted by the shut-off valve 12.

The actuation conduit 38 through which the pressurized air flows for impinging the surface 104, is designed as a channel in the inside of the central plate 40, said channel between the central plate 40 and the front plate 80 running out in the region of the surface 104 of the valve element 86. For this, an open annular channel 106 facing the valve element 86 is formed in the front plate 80, and the pressurized air may distribute in this channel, so that the air pressure acts uniformly on the entire surface 104. Furthermore, the surface 104 is designed in a curved manner, such that it is formed in an annular region lying radially inwards adjacent the peripheral region 88, distanced to the surface plane of the central plate 40.

The central region 108 opposite the surface 104 of the sealing surface 94 is designed as an abutment surface, which in the opened condition (see FIG. 7) of the shut-off valve 12, comes to bear on the surface of the front plate 80 and thus limits the path of the valve element 86 in the opened position. The central region 108 centrically comprises a projection which for guiding the valve element engages into a hole in the surface of the front plate 80.

Figure 8:
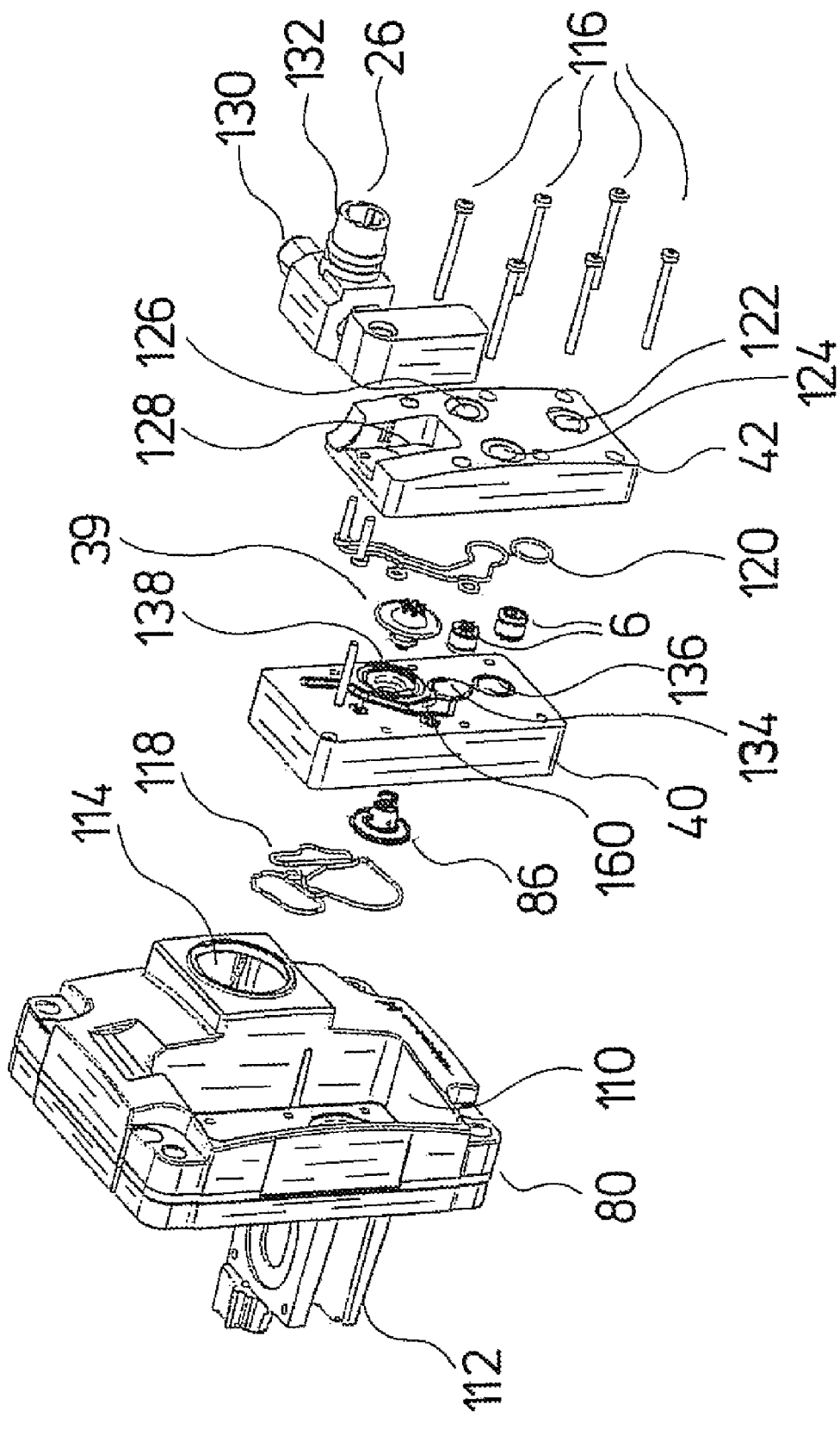
FIG. 8 is an exploded view of the pump head of the pump assembly described by way of FIGS. 1 to 6.

As is shown in the exploded view in FIG. 8, the pump head of the described metering pump assembly consists essentially of three plate-like components, specifically the central plate 40 on whose first surface the front plate 80 of a drive housing comes to bear and on whose second opposite surface, the end-plate 42 comes to bear.

The front plate 80 of the drive housing represents the carrying/support element of the compete drive housing. At its front side, i.e. the side facing the central plate 40, the drive housing comprises a recess 110 in the form of the outer contour of the central plate 40, into which the central plate 40 is inserted. On its inner side distant to the central plate 40, the front plate 80 comprises fastening devices 112 for fastening drive elements for the membrane pump, i.e. for fastening the motor as well as the gear and in particular an eccentric- or crank drive. Furthermore, all remaining components of the metering pump assembly which are arranged in the drive housing are fastened on the inner side of the front plate 80. These in particular are also electrical conductor plates, on which electrical elements for the connection of the drive device as well as the control of the metering pump assembly are arranged. The front plate comprises an opening 114 into which a central connection plug is inserted, which connects the electrical components arranged in the inside of the drive housing, or the electrical control of the metering pump assembly, to an electricity supply as well as external control elements, for example of a motor control of a lorry. The front plate 80 via holes at the corners of the front plate is connected to a pot-like drive housing which is pushed over the elements attached on the inner side of the front plate 80.

The central plate 40 is fixed via the end-plate 42, by way of fastening bolts 116, on the front plate 80 in the recess 110. The central plate 40 is clamped between the front plate 80 and the end plate 42 by way of this.

A sealing element 118 is arranged between the front plate 80 and the central plate 40, and a sealing element 120 between the central plate 40 and the end-plate 42. The sealing elements 118 and 120 seal the channels and openings formed between the central plate 40 and the front plate 80 or the end-plate 42 towards the gap between the plates adjacent one another. Thereby, the sealing elements 118 and 120 are designed such that they insulate or seal the different channels or openings and regions in the surfaces of the central plate 40 with one another.

Three connection openings 122, 124 and 126 are formed in the end-plate, via which the metering pump is connected to the external connection conduits. A suction conduit to the reduction agent tank 4 via which the metering pump 2 suctions the reduction agent, is connected to the connection opening 122. A return conduit 10 back to the reduction agent tank 4 is connected to the connection 124, through which return conduit reduction agent is pumped back into the reduction agent tank 4 on bleeding or filling the hydraulic system.

The conduit 22 to the exhaust gas system or to an injection nozzle in the exhaust gas flow is connected to the connection opening 126, by way of which conduit, the reduction agent/pressurized gas mixture is delivered from the metering pump assembly to the injection nozzle.

Furthermore, a connection opening 128 situated in a recess is formed on the end-plate 42, onto which the magnet valve 26 is applied from the front side, i.e. the side distant to the central plate 40 of the end-side 42, which magnet valve forms the pressurized air entry. The magnet valve 26 comprises a pressurized air entry 130 for connection to the pressurized air supply 24. Furthermore, the shown magnet valve 26 comprises an electrical connection plug 132. The connection lead to be connected to the electrical connection plug 132 is preferably a part of a cable loom which is connected to the connection plug inserted into the opening 114.

The connection openings 122, 124, 126 and 128 extend as through-holes through the end-plate 42, so that they are opened towards the central plate 40.

The central plate 40 comprises two through-holes 134 and 136, of which the through-hole 136 forms the suction side, and the through-hole 134 the beginning of the pressure conduit or the pressure channel 16 on the exit side of the metering pump 2. The return valves 6 are inserted into the through-holes 134 and 136 from the side facing the end-plate 42. The through-hole 136 is in connection with the connection opening 122 in the end-plate 42 via the return valve 6.

Furthermore, the recess 138 in which the premixing device 39 with the casing 44 and the surrounding sleeve 70 are inserted, is formed in the surface of the central plate 40 which faces the end-plate 42. The connection opening 126 is formed lying opposite the recess 136 in the end-plate 42, and forms the conduit 22 or the connection for the conduit 22 to the injection nozzle in the exhaust gas flow.

The recess 78 is formed on the side of the central plate 40 which faces the front plate 80, and the valve element 86 of the return- or shut-off valve 12 is inserted into this recess.

The exact course of the fluid channels in the inside of the central plate is hereinafter described in more detail by way of the views 9 to 12 of the central plate 40 in FIGS. 9 to 12.

FIG. 9 in a plan view, shows the surface of the central plate 40 facing the front plate 80. A recess 140 is formed in this surface, which defines the pump volume of the membrane pump. The recess 140 is closed by the pump membrane which is applied at the outer periphery onto the recess 140 on its edge. The through-holes 134 and 136 which extend transversely through the central plate 40 to the surface of the central plate facing the end-plate 42, open out in the base of the recess 140. The through-holes 134 and 136 are designed widened on the side distant to the end-plate 42, so that they form receivers for the return valves 6 which are inserted into the through-holes 134 and 136. As described, the through-hole 136 forms the suction conduit of the metering pump 2 through which the reduction agent is suctioned during the pump procedure. The through-hole 134 forms the beginning of the pressure conduit or the pressure channel 16, through which the reduction agent pumped by the metering pump to the premixing device 39 flows.

The through hole 134 ends on the surface of the central plate 40 which is distant to the drive housing, i.e. faces the end-plate 42, said central plate 40 being shown in a plan view in FIG. 11, in a channel 142 formed in the surface of the end-plate 40 as a groove. In turn, a through-hole 144 running obliquely to the surface extends from this channel 142 to the surface of the central plate 40 which faces the front plate 80, said central plate 40 being shown in FIG. 9. There, the through-hole 144 ends in a channel 146 which is designed as a groove or recess in the surface of the central plate 40. Again, two through-holes 148 and 150 extend from the channel 146 to the opposite surface of the central plate 40. The through-hole 150 thereby extends to the recess 138 into which the premixing device 39 is inserted, as has been described by way of FIGS. 2 to 5. The through-hole 134, the channel 142, the through-hole 144, the channel 146 as well as the through-hole 150 thus form the pressure conduit 16 which leads from the metering pump 2 to the premixing device 39.

Proceeding from the channel 146, the through-hole 148 extends to a channel 152 which is formed on the opposite surface of the central plate 40 (see FIG. 11) and which is likewise formed as a groove in the surface of the central plate 40.

From the channel 152, two through-holes 154 and 156 situated at opposite ends of the channel 152 extend to the opposite surface of the central plate 40, i.e. the surface facing the drive housing or the front plate 80. There, the through-hole 156 runs into a recess 158 which forms a receiver for the pressure sensor 14. The pressure sensor 14 is inserted through the front plate 80 from the inside of the drive housing into the central plate 40.

The through-hole 154 extends with an offset to the recess 78 in the surface of the central plate 40 which faces the front plate 80. As described by way of FIGS. 6 and 7, the shut-off valve 12 is inserted into the recess 78. The through-hole 154 thereby ends in the inlet stub 82 defining the valve seat 84. Thus the beginning of the through-hole 148 in the channel 146 forms the branching point 8 from which the return conduit 10 extends. Thereby, the return conduit 10 is formed by the through-hole 148, the channel 152 as well as the through-hole 154, to which the shut-off valve 12 in the from of the valve element 86 connects.

A channel 102 extending away in a peripheral manner is formed in the recess 78 and forms the continuation of the return conduit 10 downstream of the shut-off valve 12. The channel 102 runs into a further through-hole 160 which extends again through the central plate 40 to the opposite surface which faces the end-plate 42. The through-hole 160 lies opposite the connection opening 124 in the end-plate 42, to which the return conduit 10 to the reduction agent tank 4 is connected.

The connection opening 128 in the end-plate 42 lies opposite the through-hole 162 formed in the central plate 40. The through-hole 162 extends through the central plate 40 to a recess 164 which surrounds the recess 78 into which the return valve 12 is inserted, on the surface of the central plate 40 which faces the front plate 80. The recess 164 surrounds the outer periphery 88 of the valve element 46 (see FIG. 7), so that the recess 78 is separated from the recess 164 by the inserted valve element 86. The valve element 86 of the shut-off valve 12 is impinged with pressurized air via the recess 164 and the annular channel 106 in the front plate 80. Thus the shut-off valve 12 is closed when pressurized air flows into the through-hole 162 and when the magnet valve 26 is opened.

A second through-hole 166 branches from the recess 164 to the opposite surface of the central plate 40. The through-hole 166 is designed so narrowly that it forms the throttle 134 in the pressurized air conduit 28. Pressurized air flows through the through-hole 166 to the premixing device 39 as is described by way of FIGS. 2 to 5. The pressurized air conduit 28 is thus formed in the central plate 40 by the through-hole 162, the recess 164 and the through-hole 166. The actuation conduit 28 is defined by the recess 164.

Furthermore, a recess 168 is formed in the surface of the central plate 40 which faces the front plate 80, into which recess a heating element is inserted, via which one may heat the central plate 40 in order to prevent a freezing of the reduction agent in the channels.

The sealing element 118 which is applied onto the surface of the central plate 40 which faces the front plate 80, is formed as an integral sealing element which in each case peripherally surrounds the recess 164 as well as the recess 168, in order to seal these recesses with respect to the other channels formed in the surface and to the outside. The channel 146 is likewise surrounded by the sealing element 118, but the sealing element is formed closed over the channel 146, so that the surface of the channel 146 which is open to the outside and which faces the front plate 80 is covered by the sealing element 118. By way of this, one succeeds in the reduction agent not coming into contact with the front plate 80, so that the front plate 80 does not need to be designed resistant to the reduction agent.

Accordingly, the sealing element 120 which is applied between the central plate 40 and the end-plate 42, is designed as an integral component which surrounds the channels 142 and 152 and seals to the outside, and simultaneously peripherally surrounds the port of the through-holes 160, 162 and 136, in order to seal these outwardly towards the gap between the central plate 40 and the end-plate 42. The recess 138 is not surrounded by a separate sealing element, since this is peripherally sealed by the sleeve 70 of the premixing device 39, as has been described by way of FIG. 2.

Furthermore, six through-holes 170 are formed in the peripheral region of the end-plate 40, which extends between the surfaces of the end-plate 40 and through which the fastening bolts 116 are guided.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A metering pump assembly for admixing a fluid reduction agent into an exhaust gas flow, with a metering pump for delivering the reduction agent and with a premixing device in which, in a mixing chamber, the reduction agent delivered by the metering pump is mixed with a pressurized gas, the metering pump assembly comprising a pump head with a central plate having a first surface and an opposing second surface, the central plate forming a single component in which at least the metering pump and the premixing device are mounted, the premixing device comprising a housing part which defines the mixing chamber and which is inserted into a recess on the second surface of the central plate, which is distal to a drive of the metering pump.

2. A metering pump assembly according to claim 1, wherein at least one section of a pressure channel from the metering pump to the premixing device is formed in and/or on the central plate.

3. A metering pump assembly according to claim 1, wherein the central plate with the first surface bears on a bearing surface of a front plate of a drive housing of the metering pump assembly, wherein the front plate carries the drive of the metering pump at its side distal to the central plate.

4. A metering pump assembly according to claim 1, wherein an end-plate bears on the second surface of the central plate, said second surface being distal to the drive of the metering pump.

5. A metering pump assembly according to claim 4, wherein fluid channels for leading the reduction agent and/or the pressurized gas are formed between the first surface of the central plate and the front plate and/or between the second surface of the central plate and the end-plate.

6. A metering pump assembly according to claim 4, wherein at least one fluid connection for the pressurized gas, the reduction agent and/or the mixture of reduction agent/pressurized gas is formed on the end-plate.

7. A metering pump assembly according to claim 1, wherein the metering pump is designed as a membrane pump, and the central plate on the first surface comprises a recess which defines a pump volume and which is closed on the first surface by the pump membrane.

8. A metering pump assembly according to claim 7, wherein at least one through-hole extending to the opposite, second surface of the central plate is formed in the region of the recess in the central plate.

9. A metering pump assembly according to claim 8, wherein a return valve is arranged in the through-hole.

10. A metering pump assembly according to claim 8, wherein the through-hole in the region of the recess which extends to the opposite second surface, forms a pressure channel which connects at an exit side to the metering pump and which is connected to the premixing device as well as to a return valve arranged in the central plate.

11. A metering pump assembly according to claim 10, wherein the return valve is configured to be actuated by pressurized gas and is connected to a pressurized gas entry via a flow path formed in the central plate and/or on at least one surface of the central plate.

12. A metering pump assembly according to claim 11, wherein the return valve is applied into a recess formed on the second surface of the central plate, and is designed as a membrane valve.

13. A metering pump assembly according to claim 1, wherein the premixing device is connected to a pressurized gas entry via a flow path formed in the central plate and/or on at least one surface of the central plate.

14. A metering pump according to claim 1, wherein a pressurized gas entry is formed on the central plate or on a plate bearing on the second surface of the central plate, said pressured gas entry being connected to a switch-valve for opening and closing the pressured gas entry.

15. A metering pump assembly according to claim 2, wherein the pressure channel is in connection with a pressure sensor arranged in the central plate, and connection leads of the pressure sensor extend away from the second surface of the central plate facing a drive housing.

16. A metering pump assembly according to claim 1, wherein a recess for a heating element is formed in the central plate on the second surface facing a drive housing.

17. A metering pump assembly according to claim 1, wherein movement directions of all moving valve elements which are arranged in the central plate are parallel to one another and parallel to a movement direction of a pump membrane.

18. A metering pump assembly according to claim 1, wherein the central plate comprises respective recesses in which the metering pump and the mixing device are mounted.

19. The metering pump assembly according to claim 1, wherein the central plate with the first surface bears on a bearing surface of a front plate of a drive housing of the metering pump assembly, and wherein fluid channels for leading the reduction agent and/or the pressurized gas are formed between the first surface of the central plate and the front plate.

* * * * *